(12) United States Patent
Frankiewicz et al.

(10) Patent No.: US 8,480,276 B2
(45) Date of Patent: Jul. 9, 2013

(54) ELONGATED LIGHTING SYSTEM

(75) Inventors: Gregory P. Frankiewicz, Mayfield Heights, OH (US); Roger F. Buelow, II, Gate Mills, OH (US); David Bina, Northfield Center, OH (US); Jeremias A. Martins, Twinsburg, OH (US); Chris Jenson, Twinsburg, OH (US)

(73) Assignee: Energy Focus, Inc., Solon, OH (US)

( * ) Notice: Subject to any disclaimer, the term of this patent is extended or adjusted under 35 U.S.C. 154(b) by 147 days.

(21) Appl. No.: 13/229,480

(22) Filed: Sep. 9, 2011

(65) Prior Publication Data

US 2012/0063158 A1 Mar. 15, 2012

Related U.S. Application Data

(60) Provisional application No. 61/381,231, filed on Sep. 9, 2010.

(51) Int. Cl.
*F21V 33/00* (2006.01)
*G02B 6/00* (2006.01)

(52) U.S. Cl.
USPC .............. 362/551; 362/581; 362/555; 385/38

(58) Field of Classification Search
USPC ................. 362/551, 560, 558, 310, 296, 555, 362/581; 385/43, 51, 58, 49, 70, 93
See application file for complete search history.

(56) References Cited

U.S. PATENT DOCUMENTS

| 4,918,577 | A | 4/1990 | Furudate |
|---|---|---|---|
| 5,987,199 | A | 11/1999 | Zarian et al. |
| 6,304,693 | B1 | 10/2001 | Buelow, II et al. |
| 6,910,783 | B2 | 6/2005 | Mezei et al. |
| 7,163,326 | B2 | 1/2007 | Cassarly et al. |
| 7,330,632 | B1 | 2/2008 | Buelow, II et al. |
| 7,559,681 | B2 | 7/2009 | Suehiro et al. |
| 7,611,271 | B2 | 11/2009 | Meis et al. |
| 2008/0260329 | A1 | 10/2008 | Epstein |
| 2009/0279302 | A1 | 11/2009 | Lee |
| 2010/0177532 | A1 | 7/2010 | Simon et al. |
| 2010/0254152 | A1 | 10/2010 | Taleb-Bendiab et al. |

FOREIGN PATENT DOCUMENTS

| CN | 2551862 | 5/2003 |
|---|---|---|
| EP | 2194407 A1 | 6/2010 |

*Primary Examiner* — Joseph L Williams
(74) *Attorney, Agent, or Firm* — Bruzga & Associates; Charles E. Bruzga

(57) ABSTRACT

Elongated lighting system comprises an elongated light pipe having first and second ends, with light supplied to those ends by at least one light source, via first and second light couplers that condition light to increase reflections within the light pipe. Light-extraction structure on the light pipe extracts light from the side of the pipe. An indentation in the light pipe has a depth and has surfaces oriented with respect to the pipe so as (1) to redirect light from the first light source that reaches the indentation after passing once through a plane adjacent the indentation, back through the plane and towards the first end; and (2) to sufficiently increase the average angular distribution of light reflected from the indentation and passing back through the plane as would cause at least 50 percent more reflections of the foregoing light within the pipe in the absence of the light-extraction structure.

11 Claims, 5 Drawing Sheets

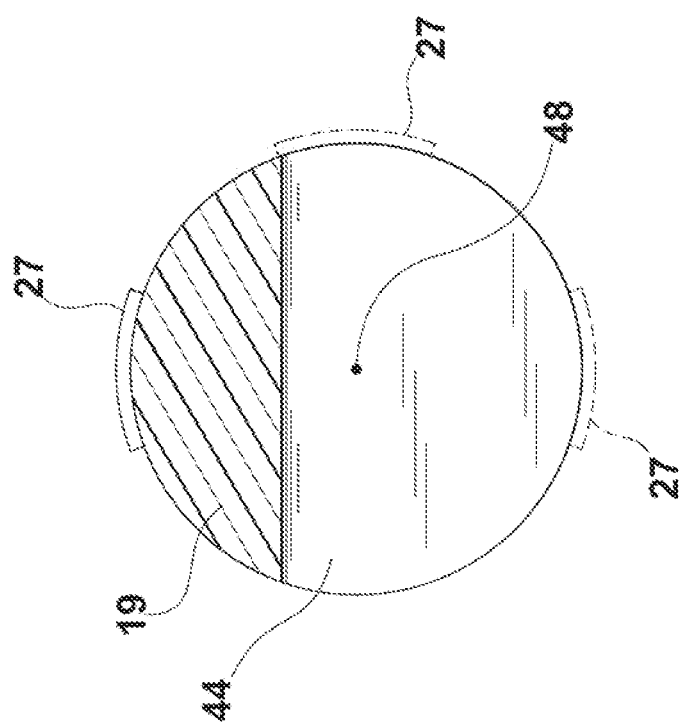

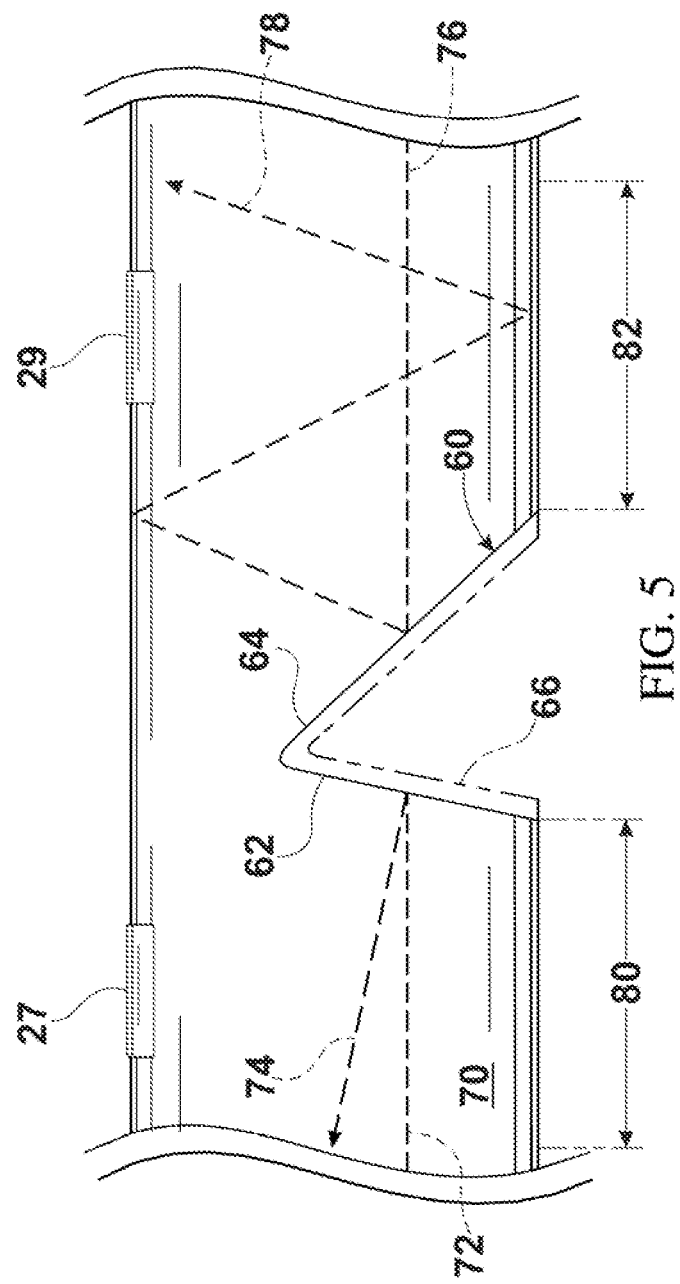

ELONGATED LIGHTING SYSTEM

CROSS-REFERENCE TO RELATED APPLICATIONS

The present application claims priority from U.S. Provisional Patent Application No. 61/381,231 filed Sep. 9, 2010, the entirety of which is incorporated herein by reference.

FIELD OF THE INVENTION

The present invention relates to an elongated lighting system having an enhanced angular distribution of light to increase efficiency.

BACKGROUND OF THE INVENTION

A prior art elongated lighting system can be constructed with a light pipe and first and second light sources at the first and second ends of the light pipe, respectively. The light pipe is provided with light-extraction means along some portion of the length of the light pipe, to extract light from the side of the light pipe. In a typical configuration, the light travels in light rays along the length of the light pipe and some of these light rays strike light-extraction means and are extracted from the side of the light pipe, and can be used for illumination or other purposes. However, some amount of light rays introduced into the light pipe by the first and second light sources do not strike the light-extraction means. This is because those light rays either propagate straight through the light pipe or only make a limited number of total internal reflections, or bounces, within the light pipe and do not strike the light-extraction means. The light rays that are not extracted by the light-extraction means are wasted, such as by encountering points in the light pipe, such as impurities, where light absorption occurs, or the light rays may reach either of the light sources and be absorbed. Such light rays, that do not reach the light-extraction means, undesirably represent a loss in efficiency of the lighting system.

It would be desirable to provide an elongated lighting system having light-extraction means along a length of a light pipe, provided with light at first and second ends, which is able to capture and extract a significant amount of light that would otherwise not reach, and be extracted by, the light-extraction means. This would increase the efficiency of an elongated lighting system of the foregoing type.

SUMMARY OF INVENTION

In a preferred form of the invention, an elongated lighting system comprises an elongated light pipe having first and second ends. At least one light source supplies light to the light pipe via the first and second ends. First and second light couplers are interposed between the at least one light source and the first and second ends, respectively. The first and second couplers each have a profile from an inlet end to an outlet end for conditioning the angular distribution of light from an associated light source so that at least 70 percent of the light provided to the light pipe totally internally reflects within the light pipe. The light pipe has an indentation formed transverse to a central path of light propagation through the light pipe. The primary means for extracting light from a side of the light pipe, along a central path of light propagation through the pipe between the first end and the indentation, is a light-extraction means on the light pipe situated between the first end and the indentation. A plane, orthogonal to the central path of light propagation through the light pipe, exists in the light pipe at an end of the indentation that is closest to the first. The indentation has a depth and has surfaces oriented with respect to the light pipe so as (1) to redirect at least 25 percent of the light from the first light source that reaches the indentation after passing once through the plane, back through the plane and towards the first end; and (2) to sufficiently increase the average angular distribution of light reflected from the indentation and passing back through the plane as would cause at least 50 percent more total internal reflections of the foregoing light within the light pipe in the absence of said light-extraction means compared to the earlier passage of the light from the first light source through the plane.

The foregoing elongated lighting system is able to capture and extract a significant amount of light that would otherwise not reach, and be extracted by, the light-extraction means. This increases the efficiency of an elongated lighting system of the foregoing type.

BRIEF DESCRIPTION OF THE DRAWINGS

Further features and advantages of the invention will become apparent when the following detailed description is read in view of the drawing figures, in which:

FIG. 4 is a cross-sectional view of the elongated lighting system of FIG. 1 taken at the arrows marked FIG. 4, FIG. 4 in FIG. 1.

FIG. 5 is a fragmentary view of an asymmetrical indentation that may be used instead of the indentation of FIGS. 1-3, showing, in simplified, schematic form, two light rays in short dashed lines when travelling in a first direction and showing the same light rays in longer dashed lines when travelling in a second direction.

DETAILED DESCRIPTION OF THE INVENTION

Figure 1:
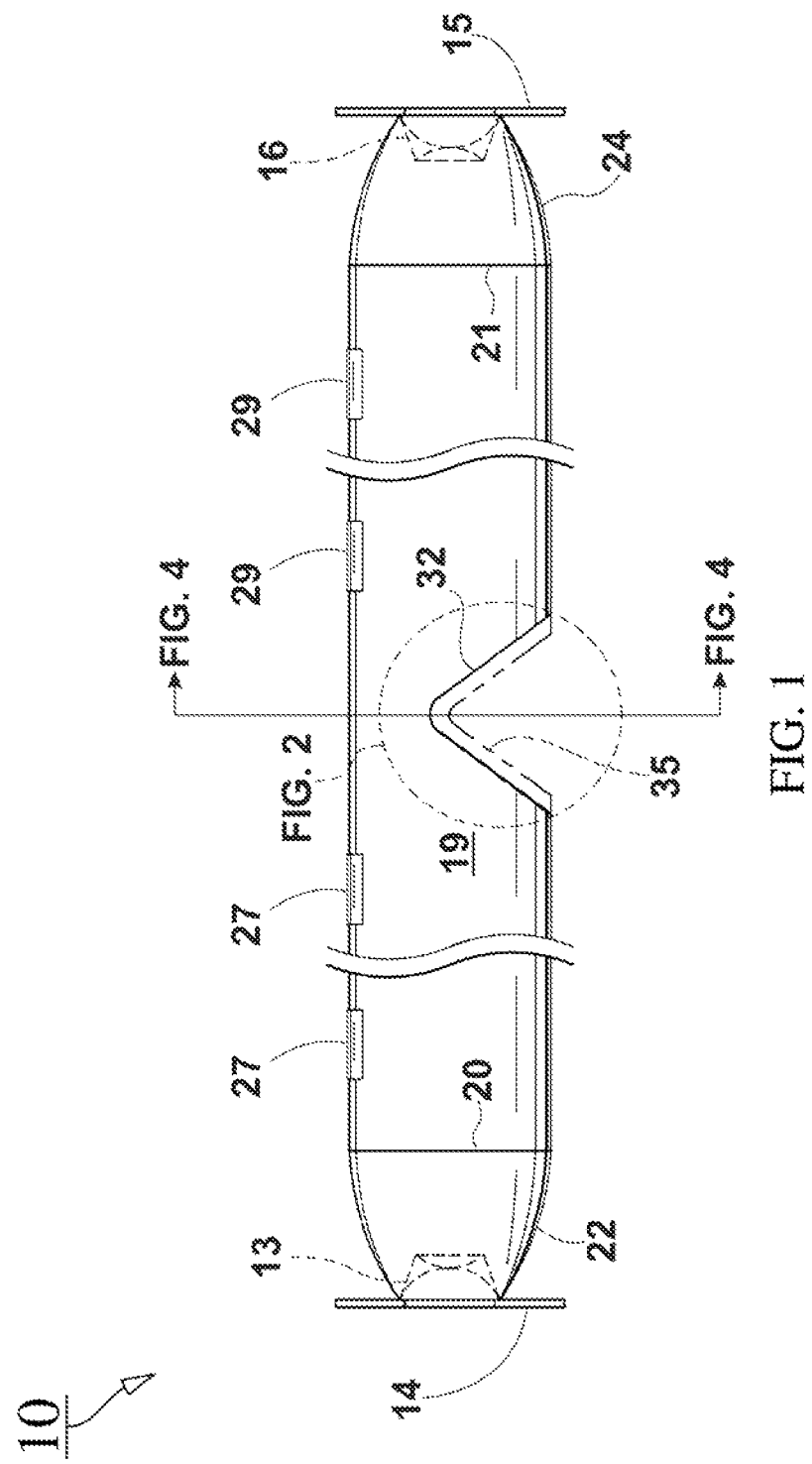
FIG. 1 is a simplified side view of an elongated lighting system in accordance with a preferred embodiment of the invention.

The following detailed description will proceed with reference to a particular illustrated embodiment. However, the embodiment shown in the drawings is presented only as an example of the claimed subject matter, and should be considered not as limiting the scope of the invention, but as merely an example of the variations and modifications obvious to a person of ordinary skill in the art.

Light Pipe Having an Indentation to Increase Efficiency

FIG. 1 shows an elongated lighting system 10 in accordance with a preferred embodiment of the invention. Light sources 13 and 16 are provided and first and second illustrated ends of lighting system 10. The light sources 13 and 16 provide their light to a light pipe 19 via light couplers 22 and 24, respectively, which condition the light to improve total internal reflection (TIR) along the length of the light pipe. Light pipes and light couplers are described in further detail below under like-named headings.

Light sources 13 and 16 are drawn as LED light sources, mounted on respective heat sinks 14 and 15, respectively. Each LED light source typically comprises one or more LED semiconductor chips provided with a single output lens and having two electrodes (not shown) for powering the LEDs with a D.C. voltage, preferably at a constant current as in routine in the art. The elongated lighting system 10 can use other types of light sources, such as a metal halide HID lamp, or a halogen lamp, or a fiber-optic light pipe, by way of example.

Light pipe 19 has light-extraction means 27 on the left-shown side, and light-extraction means 29 on the right-shown side. Light-extraction means is described in further detail below. Light-extraction means 27 and 29 extract light from the side of light pipe 19, between its left-shown end 20 and its right-shown end 21, predominantly in a downward direction. Between light extraction means 27 and 29, light pipe 19 has an indentation 32 for increasing the efficiency of light extraction by light-extraction means 27 and 29. The reasons for increase of efficiency are described below.

Figure 2:
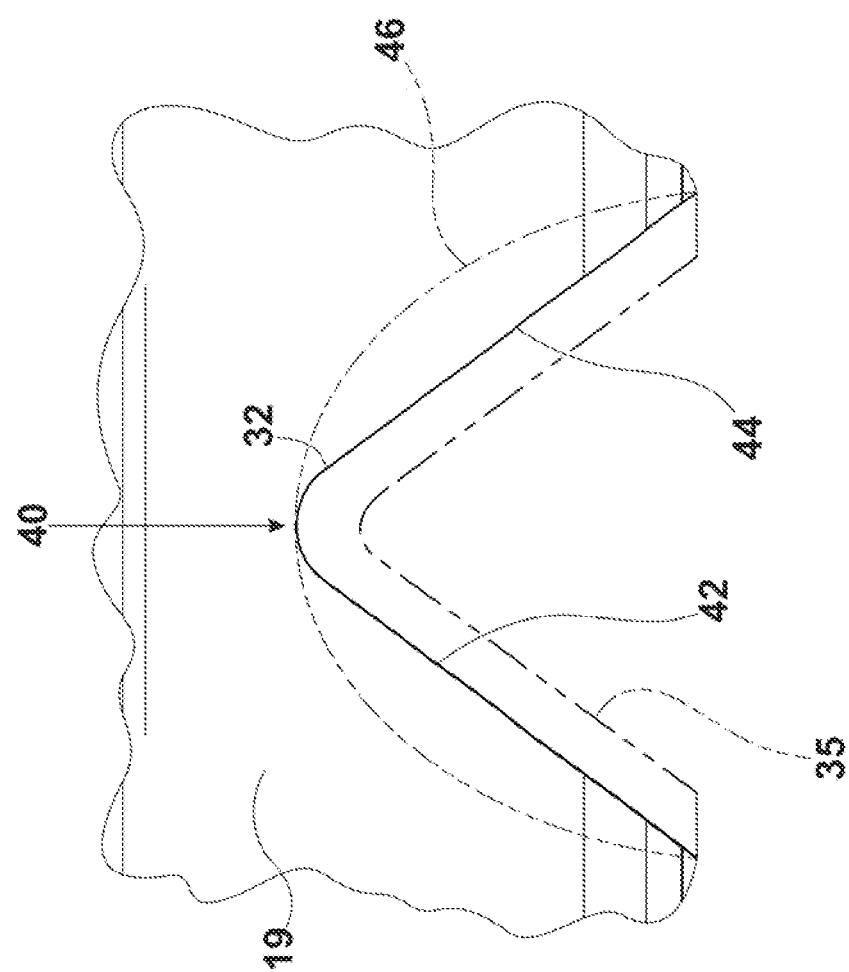
FIG. 2 is an enlarged view of the circled region in FIG. 1 marked FIG. 2.

The surfaces of indentation 32, e.g., surfaces 42 and 44 shown in FIG. 2, which are shown as largely planar, may instead be curved, such as by having a conical shape when viewed from below in FIG. 2, a semi-cylindrical shape when viewed straight into FIG. 2, a cylindrical shape that would be observed as circular when viewed from below in FIG. 2, a more gradually curved top when viewed straight into FIG. 2, or other shapes that preferably maintain concave surfaces when viewed from inside the indentation. FIG. 2 shows a curved, concave surface 46, in phantom lines, which is alternative to planar surfaces 42 and 44.

The advantage of an indentation having curved concave surfaces, as just described, rather than planar surfaces, relates to uniformity of light extraction along the length of a light pipe. A planar surface will tend to reflect light within a smaller angular distribution than a concave, curved surface. Light reflected from a concave, curved surface will have a higher angular distribution than the same light reflected from a similarly oriented planar surface. The light rays reflected from the curved surface will have their respective first total internal reflections, or bounces, from the side of the light pipe occur over a wider distributed area than the rays reflected from a similarly oriented planar surface. This typically results in a more uniform extraction of light by light-extraction means (e.g., 27 in FIG. 1) along the length of the light pipe.

Advantages of a curved surface at the top or sides of the indentation will smear the angular distribution of the light bouncing off the cut, reducing any bright spot that form from the bouncing light.

Light-extraction means 27 is the primary means for extracting light from the side of the light pipe 19, along a central path of light propagation through the light pipe, between the left-shown end 20 of the light pipe and the indentation 32. Stray light extraction of light from light pipe 19 may arise from such causes as imperfections on the surface of, or within, the light pipe causing stray light extraction, or from high angle light from the light source 13, which does not totally internally reflect within the light pipe 19, and thus exits the light pipe in the vicinity of the left-shown end 20 of the light pipe.

The light couplers 22 and 24 may be integrally and gaplessly joined to light pipe 19 at the locations of left-shown end 20 and right-shown end 21 of the light pipe; or, alternatively, the light couplers may be formed of separate parts from the light pipe but may be optically coupled to each other with an index-matching adhesive, by way of example.

Capturing and Extraction of Otherwise Lost Light

Figure 3:
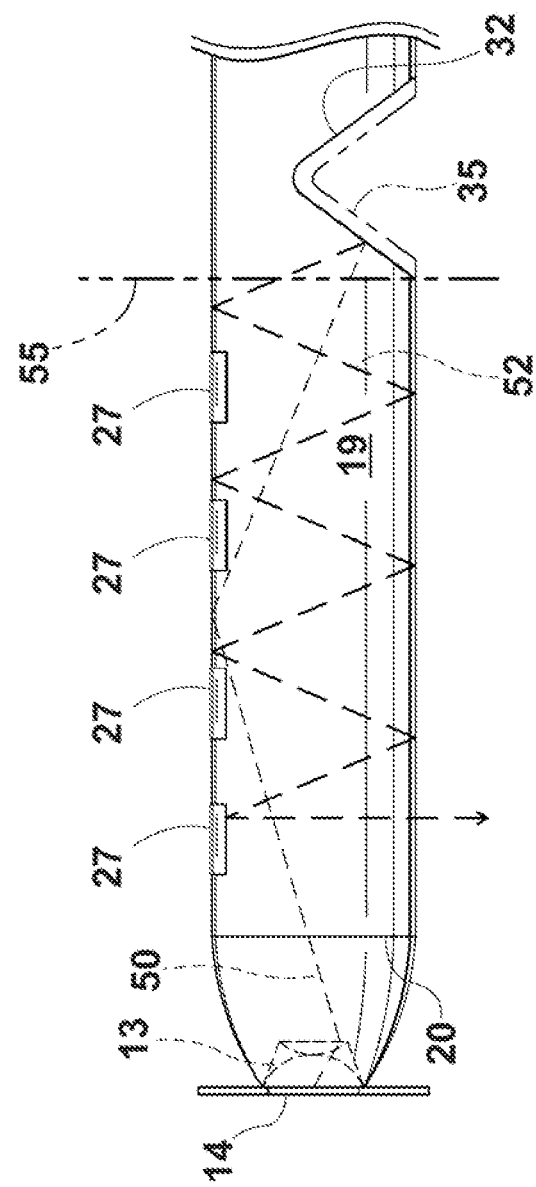
FIG. 3 is simplified side view of part of the lighting system of FIG. 1, showing, in simplified, schematic form, a light ray in short dashed lines when travelling in a first direction and showing the same light ray in longer dashed lines when travelling in a second direction.

FIG. 3 shows a portion of the elongated lighting system 10 of FIG. 1, with a light ray 50, 52 for illustrating the capturing and extraction of otherwise lost light. Light ray 50 represents the first pass of light through light pipe 19 from light source 13, through left-shown end 20 (FIG. 1) of the light pipe 19, towards right-shown end 21 (FIG. 1) of the light pipe 19. Light ray 50 reaches indentation 32, and may represent a significant percentage of light that is first provided to light pipe 19 by light source 13, and in some embodiments may even exceed 50 percent of such light. Light ray 52 represents a reverse pass of light through light pipe 19, after being reflected by total internal reflection or by reflection from an optional specular reflective surface 35, which may be applied to, or mounted near, indentation 32. A specular reflective surface 35 can redirect light received by the indentation at too high an angle to totally internally reflect from the indentation, and can thus increase overall efficiency of the lighting system 10.

As can be appreciated, reverse pass light ray 52 has more "bounces," or total internal reflections, within light pipe 19 than first pass light ray 50. This increases the probability that light ray 50, 52 will be extracted from light pipe 19, as is indicated in circled region marked FIG. 3 wherein reverse pass light ray 52 contacts light-extraction means 27 and is redirected to exit the lower side of the light pipe.

As can be appreciated from the light ray 50, 52 of FIG. 3, the first pass light ray 50 has a low angle with respect to a central path of light propagation through the light pipe 19. Such central axis would be the axial center of the light pipe 19 in a preferred embodiment where the fight pipe is linear and has a circular cross section. First pass light 50 is shown as totally internally reflecting, or bouncing, from the top of the light pipe 19; however, other first pass light (not shown) will have such a low angle as to reach the indentation 32 without having reflected from the light pipe sides. After reflection with a surface of indentation 32, the reverse pass light ray 52 has a higher angle with respect to the mentioned central path of light propagation through the light coupler 19. The higher angle of reverse pass light ray 52 increases the probability of the light ray striking part of the light-extraction means 27, compared to the lower angle, first pass light ray 50. Accordingly, the use of indentation 32 for the foregoing purpose beneficially increases the efficiency of illumination from the elongated lighting system 10.

In more quantitative terms, it is preferred that indentation 32 redirect at least 25 percent of the first pass light rays (e.g., ray 52) back through a plane 55 and toward the left-shown end 20 of light pipe 19. Rather than the 25 percent in the foregoing sentence, increasing percents of 35, 40, 50, 60 and 70 are preferred. Plane 55 is oriented orthogonally to the mentioned central path of light propagation through the light pipe 19.

Additionally, the surfaces of indentation 32 are preferably oriented to sufficiently increase the average angular distribution of light (e.g., ray 52) reflected from the indentation and passing back through the plane 55 as would cause at least 50 percent more total internal reflections of the foregoing light within the light pipe in the absence of the light-extraction means 27 compared to the earlier passage of the light (e.g., ray 50) from the left-shown end 20 of the light pipe through the plane. Making the main surfaces of indentation 32 angled shallower, rather than steeper, with respect to the central path of light propagation through the light pipe 19 will provide more total internal reflections of reverse pass light (e.g., ray 52) through the light pipe. However, an indentation with a surface orthogonal to the mentioned central path will not alter the angular distribution of reverse pass light in the manner contemplated by the present invention. Additionally, making the indentation 32 deep into the light pipe 19 increases the amount of light that can be "captured" and extracted from the light pipe in the foregoing, beneficial manner.

Because indentation 32 may be formed deeply into light pipe 19, to help preserve the structural integrity of the light pipe, it is desirable for the surfaces of the indentation to transition smoothly to other surfaces of the indentation, as shown in FIG. 2. Thus, FIG. 2 shows a transition region 40 of indentation 32, which smoothly transitions from left-shown surface 42 to right-shown surface 44. By "smoothly transitions" is meant that differently oriented surfaces of the indentation that intersect do so without any substantial discontinuities. The top of indentation 32, as viewed in FIG. 2, may also be modified to be flat instead of being curved as shown.

Placement of the Light-Extraction Means in Relation to the Indentation

Light-extraction means 27 and 29 shown in FIGS. 1 and 3 are located on the opposite, or top, side of light pipe 19 from the indentation 32, relative to a central path 48 of light propagation through the light pipe. Such relative locations of the light-extraction and the indentation typically allow for greater extraction of light for a short-length (e.g., 6 inch or 15.2 cm) light pipe where non-uniformity in illumination is difficult to perceive over such a short length. FIG. 4 shows additional exemplary placements, in phantom lines, for light-extraction means 27, in relation to indentation 32, which can achieve greater uniformity of illumination along the length of a light pipe.

In one embodiment, light-extraction means 27 is positioned on the same, upper side of light pipe 19, relative to central path 48 of light propagation through the light pipe. This beneficially provides more uniform illumination from light-extraction means 27 along the length of the light pipe, particularly around the indentation area. A similar more uniform illumination can be achieved by placing light-extraction means 27 on the right-hand (or left-hand) side of light pipe 19, as also shown in FIG. 4.

The various placements of light-extraction means 27 in FIG. 4 are shown at 90 degrees or 180 degrees from each other. However, these locations are merely exemplary, and means 27 can be placed at other locations than as illustrated.

Asymmetrically Shaped Indentations and Asymmetrical Placement

Indentation 32 shown in FIGS. 1-3 is symmetrical along the central path of light propagation through the light pipe 19, and may be placed in the middle of the length of light pipe 19, with the all illustrated structures to the right of the indentation conforming to the above description of the structures to the left of the indentation. However, reasons exist for forming an indentation that is asymmetrical along such central path, or for positioning an indentation at a location differing from the middle of the length of light pipe 19.

Thus, FIG. 5 shows an asymmetrically shaped indentation 60 having main indentation surfaces 62 and 64 in a light pipe 70. The right-shown indentation surface 64 would typically cause more total internal reflections, or bounces, of light within the light pipe than left-shown indentation 62, due to the lower angle of indentation surface 64 with respect to the central path of light propagation through the light pipe 70. This principle is illustrated by low angle first pass light rays 72 and 76, from light received at respective ends of the light pipe 70, and the reverse pass light 74 and 78 reflected from respective surfaces of indentation 60. Reverse pass light ray 78, reflected from the lower angled indentation surface 64, totally internally reflects once from the bottom of the light pipe within a length 82 of the light pipe, in addition to a total internal reflection from the top of the light pipe before reaching length 82. In contrast, reverse pass light ray 74 does not experience a total internal reflection within length 80 of the light pipe, having the same length as length 82. The foregoing asymmetrically shaping of indentation 60 allows the proximate portion of light pipe 70 to the right of the indentation 60 to be brighter than the portion of the light pipe 70 to the left of indentation 60. As with FIGS. 1-3, a specular reflective surface 66 may be used.

Another way to change the relative brightness of light as between the portions of the light pipe (e.g., 19 in FIG. 1) to the left and right of an indentation is to position the indentation closer to one end of the light pipe than the other end. Typically, the closer the indentation is located to an end of the light pipe, the brighter may be the portion of the light pipe between such end and the indentation.

One or both of asymmetry in indentation shape and asymmetry in placement of an indentation along the length of a light pipe may be employed in an elongated lighting system (not shown) for normal and emergency use. Normal use would typically utilize white light, associated with light proximate one end of the light pipe, and emergency use would typically utilize another color, such as red. One or both of the foregoing asymmetries allows either the white or the red light to have a higher brightness, as desired.

Light Pipe with a Single Light Source

In one embodiment of the present invention, a light pipe may receive light at both ends from a single light source, such as a metal halide arc lamp as shown, for instance, in FIGS. 6, 8 and 10B of U.S. Pat. No. 6,304,693, issued Oct. 16, 2001, and assigned to the present assignee. In this embodiment (not illustrated), a pair of light couplers receive light from a metal halide arc lamp, for instance, and pass light to associated light pipe portions after conditioning the light to increase total internal reflections in the light pipe portions. For a metal halide arc lamp, or any other lamp which operates at an elevated temperature, quartz, etc., rods may thermally isolate the plastic light pipe portions from the lamp. The foregoing light pipe portions may likely be free of light-extraction means, as that phrase is used herein, and will provide light to a light pipe portion having an indentation and light-extraction means as described, for instance, in connection with light pipe 19 of FIG. 1.

Light Coupler

A light coupler, with an interiorly-directed specular reflective surface, is the primary device for receiving light from a light source and transmitting that light toward a light-receiving portion of a side-light distribution arrangement, optical fiber, light pipe, or other light transmitting body, material or member. The light coupler directs both light from the light source that has been reflected by the interiorly-directed specular reflective surface of the light coupler and light directly transmitted by the light source. Specular reflective surfaces within the light coupler are typically specular if the light coupler is hollow, or of the TIR-type if the light coupler is solid (TIR meaning Total Internal Reflection).

The light coupler is shaped in such a way as to transform at least 70 percent of the light it receives into an appropriate angular distribution needed for total internal reflection within a subsequent optical member, such as a light pipe.

Typically, a light coupler, at least approximately governed by the rules of non-imaging optics, has a profile that changes from inlet end towards outlet end to condition the angular distribution of light received. A desired angular distribution of light falls within a more narrow range of angles, such that in a cylindrical light pipe the angular distribution of a majority of the light falls at or below the critical angle, i.e., "numerical aperture," to maintain total internal reflection of light within the light pipe. Thus, as light propagates through the coupler, its angular distribution changes so that it at least approximately conforms to the rules of non-imaging optics.

Light-Extraction Means

Light-extraction means may be of various types whose selection will be routine to those of ordinary skill in the art. For instance, three types of light-scattering means are disclosed in U.S. Pat. No. 7,163,326, entitled "Efficient Luminaire with Directional Side-Light Extraction," assigned to Energy Focus, Inc. of Solon, Ohio. In brief, these three types are (1) discontinuities on the surface of a light pipe, (2) a layer of paint on the surface of a light pipe, and (3) a vinyl sticker applied to the surface of a light pipe.

In more detail, (1) discontinuities on the surface of a light pipe may be formed, for instance, by creating a textured pattern on the light pipe surface by molding, by roughening the light pipe surface with chemical etchant, or by making one or more indentations in the side of the light pipe. Secondly, (2) the light-extraction means could comprise a layer of paint exhibiting Lambertian-scattering and having a binder with a refractive index about the same as, or greater than that of, the core. Suitable light-extraction particles are added to the paint, such as titanium dioxide or many other materials as will be apparent to those of ordinary skill in the art. Preferably, the paint is an organic solvent-based paint. Thirdly, (3) the light-extraction means could comprise vinyl sticker material in a desired shape applied to the surface of the light pipe. Appropriate vinyl stickers have been supplied by Avery Graphics, a division of Avery Dennison of Pasadena, Calif. The film is an adhesive white vinyl film of 0.146 mm thickness, typically used for backlit signs.

Generally, the light-extraction means may be continuous or intermittent or partially continuous and partially intermittent along the length of a light pipe, for instance. An intermittent pattern is shown in the above-mentioned U.S. Pat. No. 7,163,326 in FIG. 15A, for instance. To assure that the light-extraction means appears as continuous from the point of view of the observer in a target area to be illuminated, the target area should be spaced from the light pipe in the following manner: the spacing should be at least five times the length of the largest gaps between adjacent portions of paint or other light-extraction means along the main path of TIR light propagation through the light pipe. Further, the light extraction efficiency of each light-extraction means may be constant, variable, or both along a central path of light propagation or radially with respect to the central path of light propagation.

Light Pipe

The light pipe preferably comprises an elongated rod. By "elongated" is meant being long in relation to width or diameter, for instance, where the "long" dimension can be both along a straight path or a curved path. At least one end of the light pipe receives light from an associated light coupler. The elongated rod has an elongated sidewall and light-extraction means along at least part of the elongated sidewall for extracting light through the sidewall and distributing said light to a target area. At least that portion of the light pipe having light-extraction means is preferably solid, although there may exist in the pipe small voids caused by manufacturing processes, for instance, that have insubstantial impact on the side-light light extraction and distribution properties of the pipe.

A light pipe may comprise an acrylic polymer rod, or high-temperature glass or quartz for operation in a heated environment, or other optically clear material such as the core of a large core, flexible, plastic, fiberoptic light pipe.

A light pipe typically has a cross section along a central path of light propagation through the light pipe that is more round than flat. For instance, the minimum cross-sectional dimension is preferably more than 50% of the maximum cross-sectional dimension. In a preferred embodiment, the cross-section of the light pipe is substantially circular.

Preferably, a light pipe is rigid, by which is meant that at 20 degrees Celsius the pipe has a self-supporting shape such that the pipe returns to its original or approximately original (e.g., linear or curved) shape after being bent along a central path of light propagation through the pipe.

The following is a list of reference numerals and associated parts as used in this specification and drawings:

| Reference Numeral | Part |
|---|---|
| 10 | Elongated lighting system |
| 13 | Light source |
| 14 | Heat sink |
| 15 | Heat sink |
| 16 | Light source |
| 19 | Light pipe |
| 20 | Left-shown end |
| 21 | Right-shown end |
| 22 | Light coupler |
| 24 | Light coupler |
| 27 | Light-extraction means |
| 29 | Light-extraction means |
| 32 | Indentation |
| 35 | Specular reflective surface |
| 40 | Transition region |
| 42 | Surface |
| 44 | Surface |
| 46 | Curved surface |
| 48 | Central path |
| 50 | First pass light ray |
| 52 | Reverse pass light ray |
| 55 | Plane |
| 60 | Asymmetrical indentation |
| 62 | Indentation surface |
| 64 | Indentation surface |
| 66 | Specular reflective surface |
| 70 | Light pipe |
| 72 | First pass light ray |
| 74 | Reverse pass light ray |
| 76 | First pass light ray |
| 78 | Reverse pass light ray |
| 80 | Length |
| 82 | Length |

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. For instance, as will be apparent to a person of ordinary skill from the present specification, the degree of increase in the angular distribution of reverse pass light within the light pipe will be governed by the length and cross-sectional shape of the light pipe, the type of light source, and amount and pattern (e.g., uniform or skewed) of the desired illumination from the light pipe, as well as indentation depth, placement, angles of indentation surfaces and symmetrical or asymmetrical shaping of the indentation, most of which factors are described in detail herein. Any such modifications and substitutions by one of ordinary skill in the art are considered to be within the scope of the present invention, which is not to be limited except by the following claims.

What is claimed is:

1. An elongated lighting system, comprising:
    a) an elongated light pipe having first and second ends;
    b) at least one light source for supplying light to the light pipe via said first and second ends;
    c) first and second light couplers interposed between the at least one light source and said first and second ends, respectively; wherein the first and second couplers each have a profile from an inlet end to an outlet end for conditioning the angular distribution of light from an associated light source so that at least 70 percent of the light provided to the light pipe totally internally reflects within the light pipe;
    d) the light pipe having an indentation formed transverse to a central path of light propagation through the light pipe and having two spaced ends along the central path of light propagation; the primary means for extracting light from a side of the light pipe, along the central path of light propagation between said first end and the indentation, is a light-extraction means on the light pipe situated between said first end and the indentation; a plane, orthogonal to said central path of light propagation through the light pipe, existing in the light pipe at an end of the indentation that is closest to said first end;
    e) the indentation having a depth and having surfaces oriented with respect to the light pipe so as—
        i. to redirect at least 25 percent of the light from the first light source that reaches the indentation after passing once through said plane, back through the plane and towards said first end; and
        ii. to sufficiently increase the average angular distribution of light reflected from the indentation and passing back through the plane as would cause at least 50 percent more total internal reflections of the foregoing light within the light pipe in the absence of said light-extraction means compared to the earlier passage of the light from the first light source through said plane.

2. The elongated lighting system of claim 1, wherein the indentation has a depth and has surfaces oriented with respect to the light pipe so as to redirect at least 50 percent of the light from the first light source that reaches the indentation after passing once through said plane, back through the plane and towards said first end.

3. The elongated lighting system of claim 1, wherein the indentation contains differently oriented surfaces that are joined together by one or more transitional regions that lack discontinuities.

4. The elongated lighting system of claim 1, wherein the indentation is located on the opposite side of the light pipe from the light-extraction means relative to the central path of light propagation.

5. The elongated system of claim 1, wherein the light source comprises first and second light sources.

6. The elongated system of claim 1, wherein the indentation is configured to have a curved, concave surface when viewed from within the indentation.

7. The elongated system of claim 1, wherein the light pipe is rigid.

8. The elongated lighting system of claim 1, wherein a specular reflective means is applied to, or mounted near, the indentation surfaces to assist in redirecting light back through said plane.

9. The elongated lighting system of claim 1, wherein the indentation is symmetrically shaped along the central path of light propagation.

10. The elongated lighting system of claim 1, wherein the indentation is asymmetrically shaped along the central path of light propagation.

11. The elongated lighting system of claim 1, wherein the indentation is positioned between said first and second ends of the light pipe at a location differing from the middle of the length of the light pipe.

* * * * *